United States Patent
Kubo et al.

(10) Patent No.: US 8,199,066 B2
(45) Date of Patent: Jun. 12, 2012

(54) MAGNETIC ANTENNA AND ANTENNA DEVICE

(75) Inventors: Hiroyuki Kubo, Ishikawa-ken (JP);
Hiromitsu Ito, Ishikawa-ken (JP);
Kuniaki Yosui, Ishikawa-ken (JP)

(73) Assignee: Murata Manufacturing Co., Ltd. (JP)

( * ) Notice: Subject to any disclaimer, the term of this patent is extended or adjusted under 35 U.S.C. 154(b) by 345 days.

(21) Appl. No.: 12/646,468

(22) Filed: Dec. 23, 2009

(65) Prior Publication Data

US 2010/0156729 A1    Jun. 24, 2010

(30) Foreign Application Priority Data

Dec. 24, 2008    (JP) ................................. 2008-327416

(51) Int. Cl.
*H01Q 1/36* (2006.01)

(52) U.S. Cl. ............ 343/895; 343/702; 343/788

(58) Field of Classification Search .......... 343/702, 343/787, 788, 895
See application file for complete search history.

(56) References Cited

U.S. PATENT DOCUMENTS

| | | | | |
|---|---|---|---|---|
| 7,710,341 | B2 * | 5/2010 | Kubo et al. | 343/788 |
| 7,812,777 | B2 * | 10/2010 | Yosui et al. | 343/788 |
| 7,990,331 | B2 * | 8/2011 | Yosui et al. | 343/788 |

FOREIGN PATENT DOCUMENTS

| | | | |
|---|---|---|---|
| EP | 1 439 608 A1 | 7/2004 | |
| EP | 1 477 927 A1 | 11/2007 | |
| JP | 2002 324221 A | 11/2002 | |
| JP | 2002-325013 A | 11/2002 | |
| JP | 2004 348497 A | 12/2004 | |
| WO | 2008 019157 A1 | 2/2008 | |

OTHER PUBLICATIONS

Extended European Search Report dated Feb. 18, 2010; Application No. 09179111.1-1248.

* cited by examiner

*Primary Examiner* — Tan Ho
(74) *Attorney, Agent, or Firm* — Studebaker & Brackett PC; Tim L. Brackett, Jr.; John F. Guay

(57) ABSTRACT

There is provided a magnetic antenna and an antenna device that increase the packaging density of a portion where the magnetic antenna is mounted in an electronic apparatus, and suppresses degradation of antenna performance. A flexible substrate has first and second substantially spiral-shaped coil conductors formed thereon. Conductor-opening-side through holes are formed in the respective conductor openings of the coil conductors, and non-coil-conductor-forming-area through holes are formed in areas in which the coil conductors are not formed. First and second magnetic cores are arranged so as to extend through the respective conductor-opening-side through holes from a first main surface of the flexible substrate and to extend through the respective non-coil-conductor-forming-area through holes in a direction from a second main surface side to the first main surface of the flexible substrate.

11 Claims, 6 Drawing Sheets

PRIOR ART

PRIOR ART

MAGNETIC ANTENNA AND ANTENNA DEVICE

CROSS REFERENCE TO RELATED APPLICATIONS

The present application claims priority to Japanese Patent Application No. 2008-327416 filed Dec. 24, 2008, the entire contents of the application being incorporated herein by reference in their entirety.

BACKGROUND OF THE INVENTION

1. Field of the Invention

The present invention relates to a magnetic antenna and an antenna device used for radio frequency identification (RFID) systems, etc., that communicate with external apparatuses via electromagnetic signals.

2. Description of the Related Art

Mobile electronic apparatuses, such as cellular phones and data readers/writers, used in increasingly popular RFID systems, communicate with each other using respective antennas provided therein for information communication.

In a mobile electronic apparatus, in particular, there is a strong demand for a high performance, low cost and smaller size antenna. As an antenna that satisfies such requirements, a magnetic antenna having a magnetic core is disclosed in Japanese Unexamined Patent Application Publication No. 2002-325013.

Referring to FIG. 1, which shows a plan view of a magnetic antenna disclosed in Japanese Unexamined Patent Application Publication No. 2002-325013, an antenna coil 10 includes an air-core coil 12 formed by winding a conductor (11a, 11b, 11e, 11d) in a spiral shape in a plane on a film 12a and a flat magnetic core member 13 inserted in the air-core coil 12 so as to be substantially in parallel with the plane of the air-core coil 12. The air-core coil 12 has a hole 12d into which the magnetic core member 13 is inserted. A first terminal 11a and a linking conductor 11e are connected with a through hole 12b, and a second terminal 11b and the linking conductor 11e are connected with a through hole 12c. This magnetic antenna is arranged on a conductor plate 14.

The magnetic antenna shown in FIG. 1 disclosed in Japanese Unexamined Patent Application Publication No. 2002-325013 has a metal plate at the backside thereof. Magnetic flux passes in a substantially horizontal direction from right to left in the state shown in FIG. 1, whereby electromotive force is generated, and a current flows in the coil conductor.

However, when two of the magnetic antennas shown in FIG. 1 are provided to configure a pair of magnetic antennas by connecting the coil conductors thereof such that the currents flowing in the two coil conductors have the same phase, problems are encountered, such as described below with reference to FIGS. 1, 2A, and 2B.

FIGS. 2A and 2B show two kinds of configurations in which a pair of the magnetic antennas shown in FIG. 1 are provided.

When the magnetic antennas shown in FIG. 1 are to be configured to form a pair, two coil conductors are formed on one flexible substrate, and a magnetic core 13 is inserted into each of the winding centers of the two coil conductors formed on the films 12a, as shown in FIGS. 2A and 2B, to facilitate easier handling and lower cost of the parts.

FIG. 2A shows an example in which portions of the films 12a that connect the respective winding portions of the two coil conductors, into which the magnetic cores 13 are inserted, face the conductor plate 14. In this structural arrangement, if the conductor plate 14 is a circuit substrate, for example, then other parts cannot be mounted in an area of the circuit substrate facing the films 12a, thus causing a lower packaging density of the portion where the magnetic antenna is mounted.

FIG. 2B shows an example in which portions of the films 12a that connect the respective winding portions of the two coil conductors, into which the magnetic cores 13 are inserted, are arranged in such a manner as to be apart from the conductor plate 14. In this mounting structure, the coil conductors formed on the films 12a are close to the conductor plate 14. Hence, the magnetic flux passing through the winding centers of the coil conductors is limited to magnetic flux that enters the magnetic cores 13 through the end portions thereof, thus causing a decrease in antenna performance (i.e., a decrease in gain).

SUMMARY OF THE INVENTION

The present invention has been developed in view of the above-described problems, and it is an object of the present invention to provide a magnetic antenna and an antenna device that increase the packaging density of the portion where the magnetic antenna is mounted in an electronic apparatus, and suppresses the degradation of antenna performance.

According to preferred embodiments of the present invention, a magnetic antenna includes: a flexible substrate having first and second coil conductors formed thereon; and first and second magnetic cores.

The first and second coil conductors are formed in spiral shapes having conductor openings at the respective centers thereof. The flexible substrate has conductor-opening-side through holes, through which the magnetic cores extend, formed in the conductor openings and has non-coil-conductor-forming-area through holes, through which the magnetic cores extend, formed in areas in which the coil conductors are not formed.

The first and second magnetic cores are arranged in such a manner as to extend through the respective conductor-opening-side through holes from a first main surface of the flexible substrate and to extend through the respective non-coil-conductor-forming-area through holes from a second main surface of the flexible substrate, and the magnetic antenna is arranged such that the first main surface of the flexible substrate faces a circuit substrate in an electronic apparatus where the magnetic antenna is mounted.

Using this configuration, there exists a space between the flexible substrate of the magnetic antenna and the circuit substrate within an electronic apparatus where the magnetic antenna is mounted. Hence, the surface-mounted components can be mounted in this space. In other words, the packaging density of the portion where the magnetic antenna is mounted does not decrease.

In addition, even when the first main surface of the flexible substrate is arranged in such a manner as to face the circuit substrate having a plate-shaped ground electrode formed thereon, the coil conductors are apart from the ground electrode of the circuit substrate. This prevents narrowing of an opening through which magnetic flux passes and a decrease in antenna gain.

When the non-coil-conductor-forming-area through holes each are substantially shaped like slits forming three sides of a quadrangle (U-shape), the magnetic cores can be easily inserted, resulting in reduction in manufacturing cost.

On the flexible substrate, a center portion coil conductor that is linked with magnetic flux passing along the flexible substrate may be formed between positions where the two coil conductors are formed. This accordingly allows electromotive force due to the center portion coil conductor to be applied, whereby the antenna gain is increased.

When the magnetic antenna is built into an electronic apparatus to form an antenna device, the flexible substrate of the magnetic antenna may be bonded to an inner surface of the casing of the electronic apparatus. This accordingly allows the magnetic antenna to have a stable structure in the casing of the electronic apparatus.

In the magnetic antenna according to preferred embodiments of the present invention, by arranging the first main surface side of the flexible substrate in such a manner as to face circuit substrate side in an electronic apparatus where the magnetic antenna is mounted, there exists space between the flexible substrate of the magnetic antenna and the circuit substrate within an electronic apparatus where the magnetic antenna is mounted. Hence, the surface-mounted components can be mounted in this space, whereby the packaging density of the portion where the magnetic antenna is mounted is prevented from decreasing.

In addition, even when the first main surface of the flexible substrate is arranged in such a manner as to face the circuit substrate having a plate-shaped ground electrode formed thereon, the coil conductors are apart from the ground electrode of the circuit substrate. This prevents a decrease in antenna gain.

Other features, elements, characteristics and advantages of the present invention will become more apparent from the following detailed description of preferred embodiments of the present invention with reference to the attached drawings.

DESCRIPTION OF THE PREFERRED EMBODIMENTS

A magnetic antenna according to a first embodiment of the present invention will be described with reference to FIGS. 3 and 4.

Figure 3A:
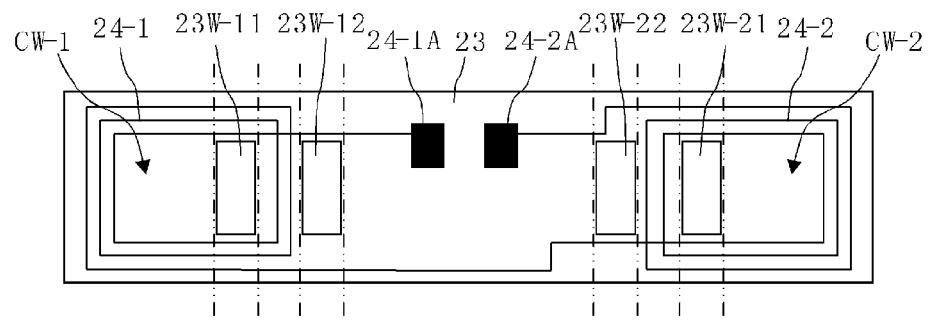
FIG. 3A is a development diagram of a flexible substrate 23 used for a magnetic antenna 20 according to a first embodiment of the present invention.
Figure 3B:
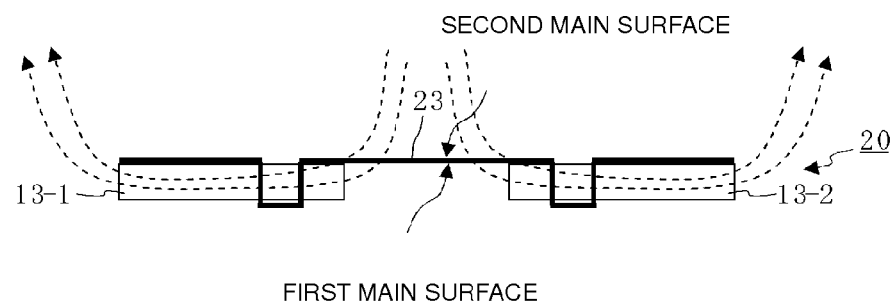
FIG. 3B is a sectional view of the magnetic antenna 20.
Figure 3C:
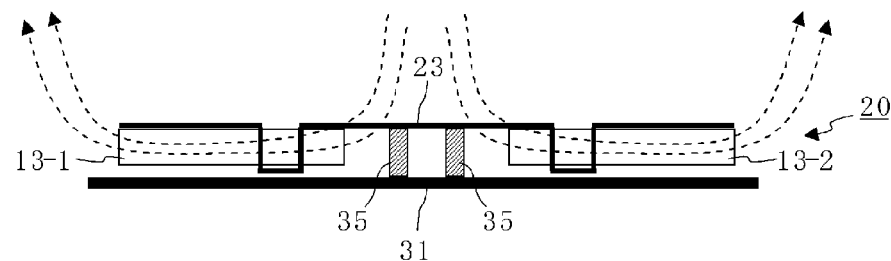
FIG. 3C is a sectional view showing the positional relationship between a circuit substrate 31 of an electronic apparatus and the magnetic antenna 20.

FIG. 3A is a development diagram of a flexible substrate 23 used for a magnetic antenna 20, FIG. 3B is a sectional view of the magnetic antenna 20, and FIG. 3C is a sectional view showing the positional relationship between a circuit substrate 31 of an electronic apparatus and the magnetic antenna 20.

Referring to FIG. 3A, the flexible substrate 23 has spiral coil conductors 24-1 and 24-2 formed thereon, and respective opening portions of the spiral coil conductors have conductor-opening-side through holes 23W-11 and 23W-21 formed therein into which the magnetic cores 13 are inserted. The flexible substrate 23 has non-coil-conductor-forming-area through holes 23W-12 and 23W-22, into which the magnetic cores 13 are inserted, formed in areas where the spiral coil conductors 24-1 and 24-2 are not formed.

Referring to FIG. 3B, a magnetic core 13-1 is provided on the flexible substrate 23 such that the magnetic core 13-1 is inserted from a first main surface side of the flexible substrate 23 into the conductor-opening-side through hole 23W-11 and the magnetic core 13-1 extends through the non-coil-conductor-forming-area through hole 23W-12 in a direction from a second main surface side of the flexible substrate 23 to the first main surface side of the flexible substrate 23.

Similarly, a magnetic core 13-2 is provided on the flexible substrate 23 such that the magnetic core 13-2 is inserted from the first main surface side of the flexible substrate 23 into the conductor-opening-side through hole 23W-21 and the magnetic core 13-2 extends through the non-coil-conductor-forming-area through hole 23W-22 in a direction from a second main surface side of the flexible substrate 23 to the first main surface side of the flexible substrate 23.

The magnetic antenna 20 is used in such a manner that magnetic flux passes through the two magnetic cores 13-1 and 13-2 from the inner ends to the outer ends thereof, as shown by chain lines in FIG. 3B, or reversely, from the outer ends to the inner ends thereof.

The two coil conductors 24-1 and 24-2 are connected to each other such that currents having the same phase are induced by magnetic flux passing through respective coil conductor openings CW-1 and CW-2 of the two coil conductors 24-1 and 24-2, and one end of the coil conductor 24-1 and one end of the coil conductor 24-2 are formed as coil conductor connection portions 24-1A and 24-2A.

Referring to FIG. 3C, the circuit substrate 31 of an electronic apparatus has two pins 35 and 35 formed thereon. To electrically connect the magnetic antenna 20 to the circuit substrate 31, the coil conductor connection portions 24-1A and 24-2A are made to contact the pins 35 and 35.

Figure 4A:
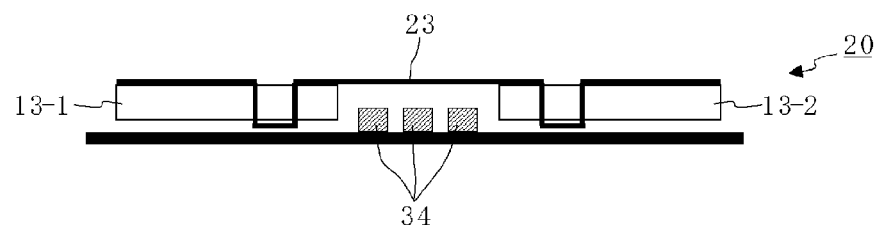
FIG. 4A is a sectional view showing the relationship between surface-mounted components 34 and the magnetic antenna 20 mounted on the circuit substrate 31.

FIG. 4A is a sectional view showing the relationship between surface-mounted components 34 and the magnetic antenna 20 mounted on the circuit substrate 31. Here, since FIG. 4A is a sectional view along a line different from the line passing through the pins 35 and 35 shown in FIG. 3C, the pins 35 and 35 do not appear in FIG. 4A.

In this manner, there exists space between the circuit substrate 31 and the flexible substrate 23 of the magnetic antenna 20 within an electronic apparatus. Hence, the surface-mounted components 34 can be mounted in this portion, whereby the packaging density of the portion where the magnetic antenna 20 is mounted can be increased.

Figure 4B:
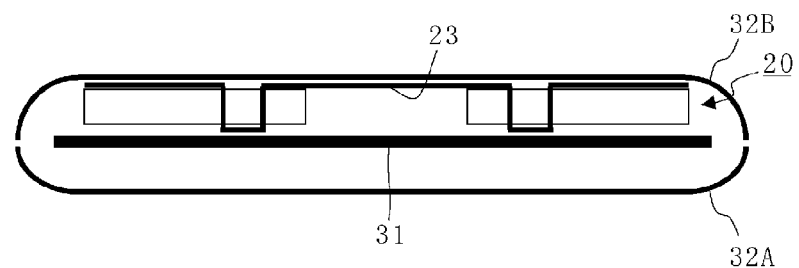
FIG. 4B is a sectional view showing the relationship between the magnetic antenna 20 and a casing of an electronic apparatus.

FIG. 4B is a sectional view showing the relationship between the magnetic antenna 20 and a casing of an electronic apparatus. The casing of the electronic apparatus is made up of two casings 32A and 32B which are shaped like two pieces obtained by dividing a casing. The magnetic antenna 20 is fixed to the casing 32B among the two casings 32A and 32B, and the connection portions of the flexible substrate 23 and the inner surface of the casing 32B are bonded using, for example, double-sided adhesive tape.

Note that illustrations of the pins 35 shown in FIG. 3C and the surface-mounted components 34 shown in FIG. 4A are omitted in FIG. 4B.

Figure 1:
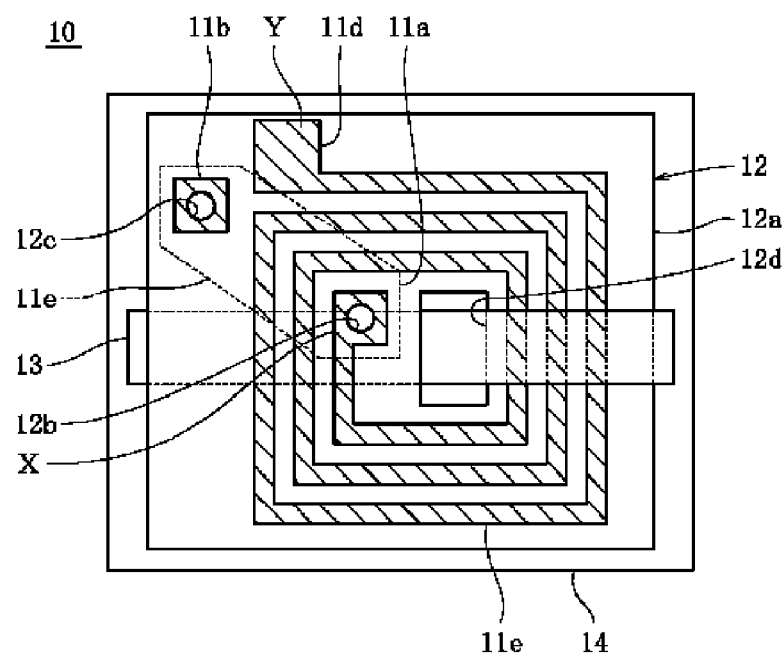
FIG. 1 is a plan view of a magnetic antenna disclosed in Japanese Unexamined Patent Application Publication No. 2002-325013.
Figure 2A:
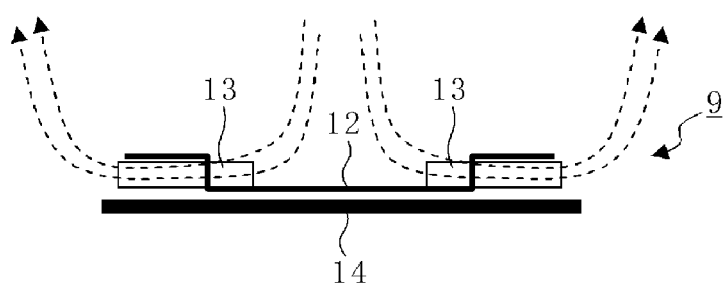
FIG. 2A illustrates one configuration in which a pair of the magnetic antennas shown in FIG. 1 are provided.
Figure 2B:
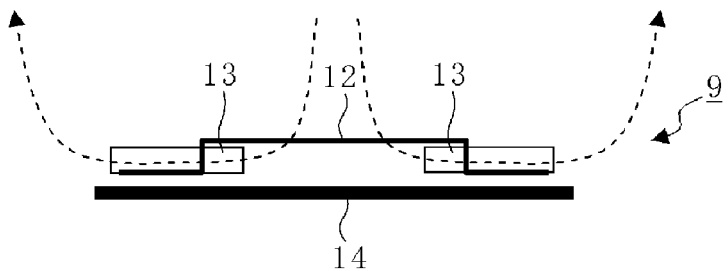
FIG. 2B illustrates another configuration in which a pair of the magnetic antennas shown in FIG. 1 are provided.
Figure 4C:
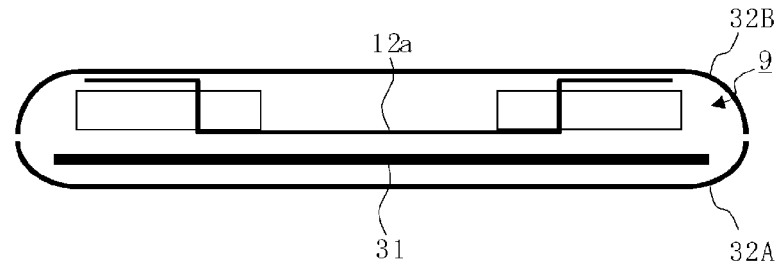
FIG. 4C is a sectional view showing the relationship between the coil antenna shown in FIG. 2A and a casing of an electronic apparatus.

For comparison, when the coil antenna 9 shown in FIG. 2A configured using a known technology is to be fixed to the casing 32B, the film 12a is in a suspending state within the electronic apparatus as shown in FIG. 4C. Hence, the antenna cannot be connected using the pins 35 shown in FIG. 3C, making it difficult to electrically and mechanically fix the antenna.

In the example described above, the flexible substrate of the magnetic antenna 20 is bonded to the inner surface of the casing 32B of the electronic apparatus. However, the present invention is not limited to this example. The magnetic antenna according to the present invention may be arranged, for example, on a circuit substrate directly or with a structural member therebetween. Alternatively, the antenna may be arranged directly on a conductor plate, such as a metal case or a shielding case, attached to the circuit substrate or with a structural member therebetween. Further, the antenna may be arranged at a position at which a conductor such as a card slot or a battery pack is arranged. This is also the case with other embodiments described below.

Figure 5A:
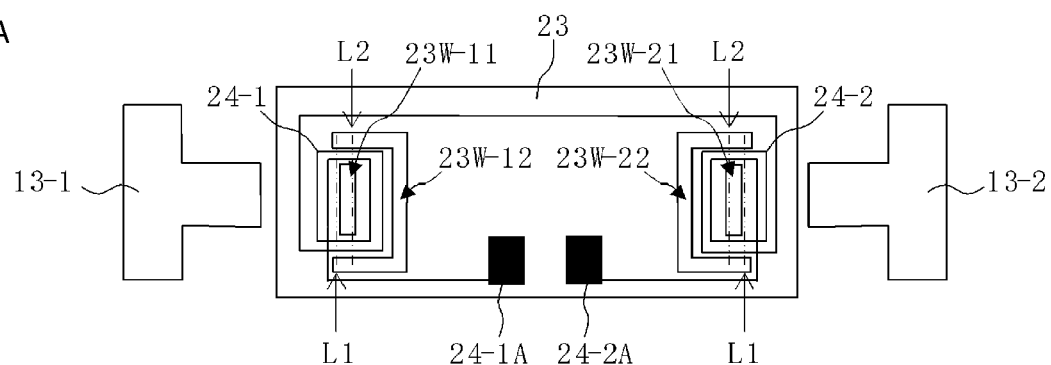
FIG. 5A is a plan view of a magnetic antenna 21 before assembly according to a second embodiment.
Figure 5B:
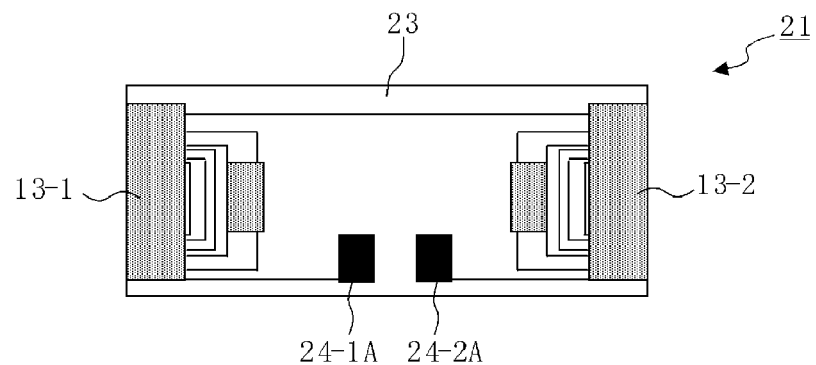
FIG. 5B is a plan view after assembly.
Figure 5C:
FIG. 5C is a sectional view thereof.

FIG. 5A is a plan view of a magnetic antenna 21 prior to assembly according to a second embodiment of the invention. FIG. 5B is a plan view after assembly and FIG. 5C is a sectional view thereof.

A flexible substrate 23 has spiral coil conductors 24-1 and 24-2 formed thereon, and respective winding center portions of the coil conductors 24-1 and 24-2 have conductor-opening-side through holes 23W-11 and 23W-21 formed therein. The flexible substrate 23 has non-coil-conductor-forming-areathrough holes 23W-12 and 23W-22 formed therein, each of which is a substantially U-shaped hole, i.e., a hole made of slits forming three sides of a quadrangle.

In this example, the magnetic cores 13-1 and 13-2 are formed such that portions thereof which extend through the conductor-opening-side through holes 23W-11 and 23W-21 and the non-coil-conductor-forming-area through holes 23W-12 and 23W 22 of the flexible substrate 23 have smaller widths than outer portions, which are made wide.

The magnetic core 13-1 is attached to the flexible substrate 23 as follows. First, referring to FIG. 5A, the portion sandwiched between the conductor-opening-side through hole 23W-11 and the non-coil-conductor-forming-area through hole 23W-12 is bent upward by about 90 degrees along a left side two-dot chain line L1, and the magnetic core 13-1 is inserted into the conductor-opening-side through hole 23W-11. Then the substantially U-shaped portion is bent by about 90 degrees along a left side two-dot chain line L2 in FIG. 5A so as to contact the upper surface of the magnetic core 13-1.

Likewise, the magnetic core 13-2 is attached to the flexible substrate 23 as follows. First, referring to FIG. 5A, the portion sandwiched between the conductor-opening-side through hole 23W-21 and the non-coil-conductor-forming-area through hole 23W-22 is bent upward by about 90 degrees along a right side two-dot chain line L1, and the magnetic core 13-2 is inserted into the conductor-opening-side through hole 23W-21. Then the substantially U shaped portion is bent by about 90 degrees along a right side two-dot chain line L2 in FIG. 5A so as to contact the upper surface of the magnetic core 13-2.

To mount the magnetic antenna 21 shown in FIGS. 5B and 5C, the magnetic antenna 21 is turned upside down from the state shown in FIGS. 5B and 5C, and built into an electronic apparatus similarly to the one shown in FIG. 3C.

In this manner, by making the conductor-opening-side through holes substantially U-shaped, the magnetic cores can be easily inserted, resulting in reduction in manufacturing cost.

In addition, by making the outer portions of the magnetic cores 13 wider, the magnetic resistance can be decreased without enlarging the whole magnetic antenna 21, whereby the antenna gain is increased.

Figure 6A:
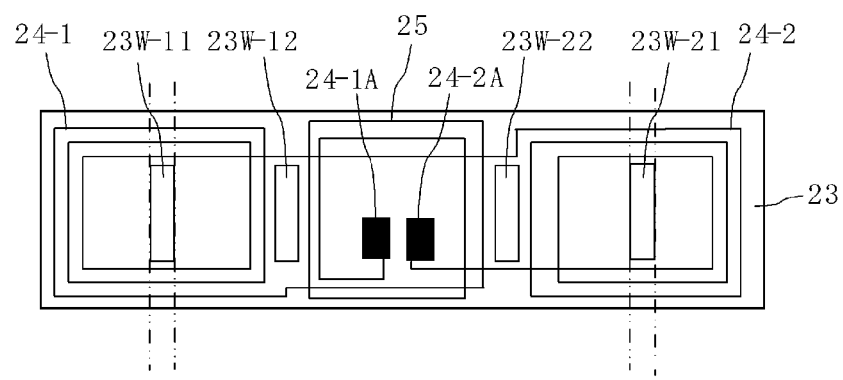
FIG. 6A is a development diagram of a flexible substrate 23 used for a magnetic antenna 22 according to a third embodiment.
Figure 6B:
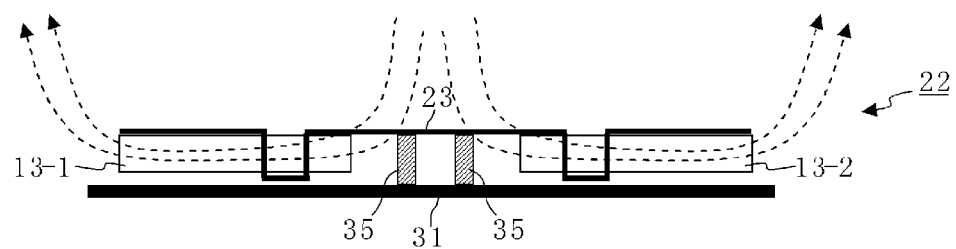
FIG. 6B is a sectional view of the third embodiment shown in FIG. 6A.

FIG. 6A is a development diagram of a flexible substrate 23 used for a magnetic antenna 22 according to a third embodiment of the invention, and FIG. 6B is a sectional view thereof. In this example, the flexible substrate 23 has, as another coil conductor, a center portion coil conductor 25 provided thereon between the positions where the two coil conductors 24-1 and 24-2 are formed.

The center portion coil conductor 25 is arranged at such a position as to be able to be linked with magnetic flux passing by the center portion of the flexible substrate 23, as shown by dotted lines in FIG. 6B. These three coil conductors are connected in series such that magnetic flux passing in the directions shown in FIG. 6B induces currents having the same phase in the two coil conductors 24-1 and 24-2, and the center portion coil conductor 25.

In this manner, by providing the center portion coil conductor 25, electromotive force due to the center portion coil conductor 25 is applied, whereby the antenna gain is increased.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A magnetic antenna for mounting on an electronic apparatus having a circuit substrate, comprising:
   a flexible substrate having first and second coil conductors formed thereon; and
   first and second magnetic cores,
   wherein the first and second coil conductors are formed in spiral shapes having conductor openings at the respective centers thereof,
   wherein the flexible substrate has conductor-opening-side through holes, through which the magnetic cores extend, formed in the conductor openings, the flexible substrate including non-coil-conductor-forming-area through holes, through which the magnetic cores extend, formed in areas in which the coil conductors are not formed,
   wherein the first and second magnetic cores are arranged to extend through the respective conductor-opening-side through holes from a first main surface of the flexible substrate and to extend through the respective non-coil-conductor-forming-area through holes from a second main surface of the flexible substrate, and
   wherein the first main surface of the flexible substrate is positioned to face the circuit substrate in the electronic apparatus.

2. The magnetic antenna according to claim 1, wherein the non-coil-conductor-forming-area through holes each are substantially shaped like slits forming three sides of a quadrangle.

3. The magnetic antenna according to claim 2, wherein a center portion coil conductor, linked with magnetic flux passing along the flexible substrate, is formed on the flexible substrate between positions where the two coil conductors are formed.

4. The magnetic antenna according to claim 1, wherein a center portion coil conductor, linked with magnetic flux passing along the flexible substrate, is formed on the flexible substrate between positions where the two coil conductors are formed.

5. The magnetic antenna of claim 1, further including at least one surface-mounted component mounted on the circuit substrate, the at least one surface-mounted component facing the first main surface of the flexible substrate and being positioned in an area between the first and the second magnetic cores.

6. The magnetic antenna of claim 1, wherein the each of the first and second magnetic cores includes an outer portion wider than a portion extending through the non-coil-conductor forming area through hole.

7. An antenna device, comprising:
a magnetic antenna for mounting on an electronic apparatus having a circuit substrate, including:
a flexible substrate having first and second coil conductors formed thereon; and
first and second magnetic cores,
wherein the first and second coil conductors are formed in spiral shapes having conductor openings at the respective centers thereof,
wherein the flexible substrate has conductor-opening-side through holes, through which the magnetic cores extend, formed in the conductor openings, the flexible substrate including non-coil-conductor-forming-area through holes, through which the magnetic cores extend, formed in areas in which the coil conductors are not formed,
wherein the first and second magnetic cores are arranged to extend through the respective conductor-opening-side through holes from a first main surface of the flexible substrate and to extend through the respective non-coil-conductor-forming-area through holes from a second main surface of the flexible substrate, and
wherein the first main surface of the flexible substrate is positioned to face the circuit substrate in the electronic apparatus; and
a casing of the electronic apparatus in which the magnetic antenna is provided,
wherein the flexible substrate of the magnetic antenna is bonded to an inner surface of the casing.

8. The antenna device according to claim 7, wherein the non-coil-conductor-forming-area through holes each are substantially shaped like slits forming three sides of a quadrangle.

9. The antenna device according to claim 7, wherein a center portion coil conductor, linked with magnetic flux passing along the flexible substrate, is formed on the flexible substrate between positions where the two coil conductors are formed.

10. The antenna device of claim 7, further including at least one surface-mounted component mounted on the circuit substrate, the at least one surface-mounted component facing the first main surface of the flexible substrate and being positioned in an area between the first and the second magnetic cores.

11. The antenna device of claim 7, wherein the each of the first and second magnetic cores includes an outer portion wider than a portion extending through the non-coil-conductor forming area through hole.

* * * * *